ENDLESS TAPE CARTRIDGE

Filed June 24, 1966 Sheet 1 of 2

INVENTOR
ROBERT BECKER &
BY ARNOLD P. HULTGREN
Bair, Freeman & Molinare
ATTORNEYS April 15, 1969 R. BECKER ET AL 3,438,591

ENDLESS TAPE CARTRIDGE

Filed June 24, 1966 Sheet 2 of 2

INVENTOR.
ROBERT BECKER &
BY ARNOLD P. HULTGREN

Dau, Freeman & Molinare

ATTORNEYS

United States Patent Office 3,438,591
Patented Apr. 15, 1969

3,438,591

ENDLESS TAPE CARTRIDGE

Robert Becker, Chicago, and Arnold P. Hultgren, River Forest, Ill., assignors to Amerline Corporation, Chicago, Ill., a corporation of Illinois Filed June 24, 1966, Ser. No. 560,245
Int. Cl. B65h 17/44, 17/48
U.S. Cl. 242—55.19 10 Claims

ABSTRACT OF THE DISCLOSURE

A cartridge containing an "endless" reel of magnetic sound tape supported on a rotating platform, the cartridge including a brake mechanism operated by depressing a plunger which extends outwardly from the cartridge, the brake mechanism serving to lock the platform against rotation and to secure the tape coil by clamping at least a portion of it between the platform and a friction pad fitted to the interior of the cartridge.

*Background of the invention*

This invention relates to magnetic sound tape recording and play-back systems and, more particularly, to an improved magazine for carrying an endless tape reel.

Magazine-loaded tape players are enjoying increasing popularity, particularly in automobile installations, due to the convenience with which the magazine-held tape may be handled. Threading is eliminated since the magazine merely "plugs in" to the player. Rewinding is likewise made unnecessary by joining the ends of a coiled tape to form an "endless reel" capable of continuous operation. An earlier endless tape magazine of this basic type is disclosed in U.S. Patent 2,922,642, which issued to B. A. Cousino on Jan. 26, 1960.

In the preferred endless tape systems, the tape is wound into a spiral coil which rests on a rotatable disc or turntable. The inner and outermost convolutions of the coil are joined together by a loop of tape which is passed through the pick-up head assembly. At another point on this uncoiled loop, the tape is sandwiched between a drive capstan and a pinch roller. Rotation of the capstan pulls the tape from the inner convolution and through the head assembly at a constant linear speed, causing the turntable to rotate and rewinding the played tape onto the outside convolution of the coil.

Because the tape located at the outer convolution must have the same linear speed as the tape in the inner convolution, the greater periphery of the outer convolution requires that it move at a slower angular speed than the inner-convolution. Thus, each convolution must be able to slip with respect to its neighbors. To permit this relative motion, the tape is commonly coated with a graphite lubricant.

As the magazine is handled, the tape is likely to become tangled. This likelihood is increased by the slippery character of the tape which allows convolutions to become easily unravelled from the main body of the coil. Moreover, since the coil is normally mounted on a freely rotatable platform, the tape may become snarled due to undesirable platform rotation. Unless first disentangled, the tape will normally break during a subsequent attempt to use the magazine.

It is accordingly a general object of the invention to securely store magnetic sound tape.

It is a further object of the present invention to improve the performance and reliability of magazines which house an endless coil of magnetic sound tape.

It is a still further object of the invention to provide an endles tape magazine capable of securely retaining the tape in a desired coiled configuration even though the magazine is subjected to shock and vibration.

*Summary of the invention*

In a principal aspect, the present invention takes the form of an improved magazine for carrying a continuous loop of magnetic sound tape, a portion of which is wound into a spiral coil and the remainder of which is aligned along a path joining the innermost and outermost convolutions of the spiral coil. In accordance with a first feature of the invention, the coil is supported on a platform which is mounted both for rotation about an axis and for movement parallel to this axis. A brake shoe member positioned adjacent the platform is also mounted for movement parallel to the axis. According to a further feature of the invention, at least one friction pad is fixedly positioned on that side of the platform which is opposite from the brake shoe member. In accordance with the principles of the invention, means are employed for moving the brake shoe from a position spaced apart from the platform to a position of engagement with the platform to prevent platform rotation. According to a further feature of the invention, the brake shoe also carries the platform axially to move the coil of tape into engagement with the fixed friction pad. As contemplated by the invention, the brake shoe serves to lock the platform against rotation and to secure the tape coil by clamping at least a portion of it between the platform and the friction pad.

*Brief description of the drawings*

These and other objects, features and advantages of the present invention will become more apparent through a consideration of the following detailed description. In the course of this description, reference will frequently be made to the attached drawings in which.

*Description of the preferred embodiment*

Figures 1, 2:
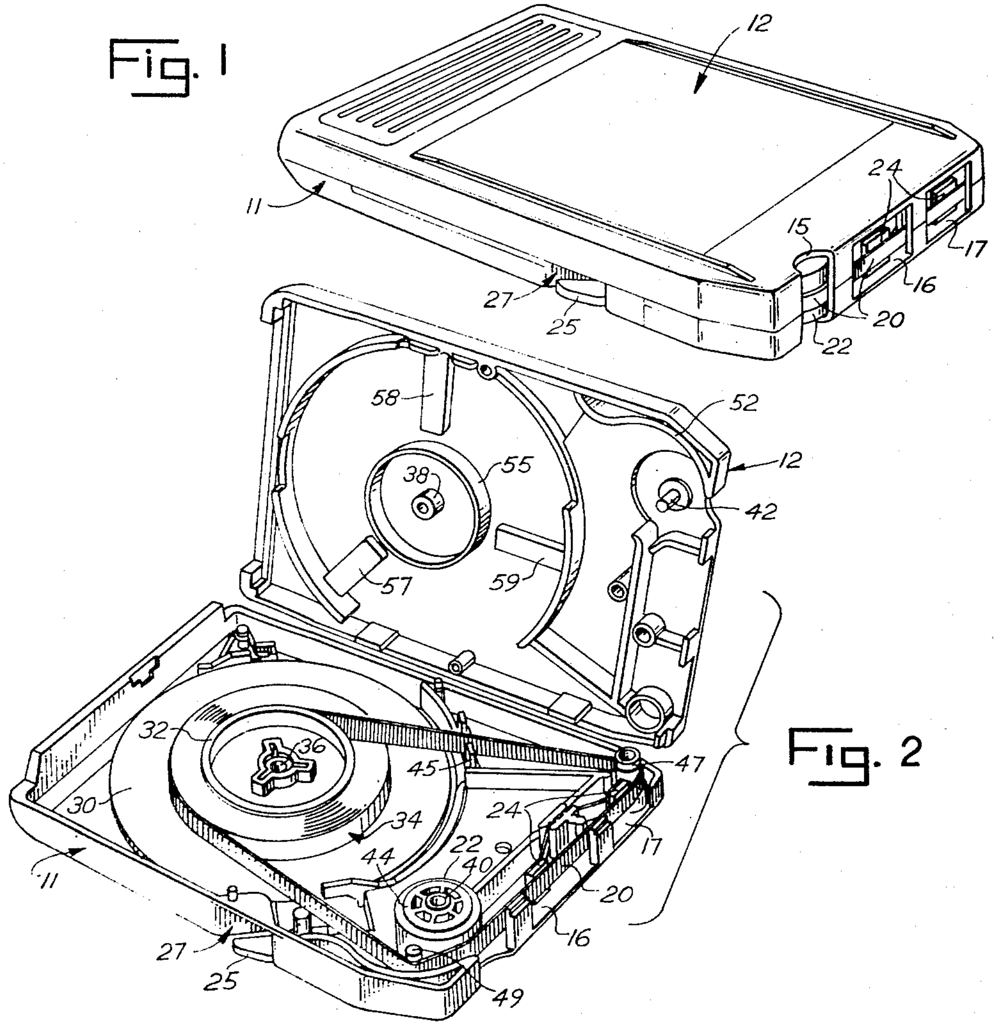
FIGURE 1 is a perspective view showing the exterior of the assembled tape-carrying magazine.
FIGURE 2 is a perspective view of the magazine shown with the cover opened and with the tape reel assembly in place.

The exterior details of a preferred tape-carrying magazine embodying the principles of the invention is shown in FIGURE 1 of the drawings. The magazine case comprises a base section indicated generally at 11 and a cover indicated generally at 12, each of which is constructed of a molded plastic such as polystyrene. Three apertures 15, 16 and 17 are defined on one end of the magazine to expose the tape 20. At aperture 15, the tape 20 is guided by a pinch roller 22 and at apertures 16 and 17 by pressure pads 24. A brake actuator 25 is positioned within a recess (indicated generally at 27) in the base section 11 of the magazine. When inserted into a tape player, the tape 20 at aperture 15 is sandwiched between the pinch roller 22 and a rotating drive capstan, thereby applying motive force to the tape. The apertures 16 and 17 permit engagement of the tape with a playback head, a recording head, and/or tape responsive control devices. As will be more clearly understood through a consideration of the description to follow, insertion of the magazine into operating position within the tape player depresses the brake actuator 25 to release the brake to allow free movement of the tape.

As shown in FIGURE 2 of the drawings, an endless tape reel assembly is positioned within the magazine. This assembly comprises a rotatable turntable 30 and a central hub 32 which support a spiral coil of tape shown generally at 34. The tape loop 20 which passes near apertures 15, 16 and 17 adjoins the inner and outermost convolutions of the coil 34. With the cover 12 in position as shown in FIGURE 1, the turntable 30 and hub 32 are coaxially mounted on an axle formed by the lower axle half 36 (fixedly mounted to the base section 11) and the upper axle half 38 (fixedly mounted to the cover 12). The pinch roller 22 rotates about an axle formed by the hollow stem 40 (which is a molded part of the base section 11) and a stud 42 which is mounted on the cover 12 and which extends downwardly into the hollow stem 40 when the cover 12 is in position. The pinch roller 22 is constructed of rubber or the like and is mounted on a molded plastic hub 44.

The tape loop 20, being sandwiched between the pinch roller 22 and a rotating drive capstan, is pulled from the inner convolution of coil 34, rotating the platform 30 in a clockwise direction as viewed from above, and rewinding the tape loop 20 on the outer convolution of coil 34. As the tape loop 20 is drawn from the inner convolution, it passes through a tape guide 45 and around a corner guidepost 47, past the apertures 16 and 17 to the pinch roller 44. From the pinch roller 44, the tape passes between a stripping post 49 (which projects upwardly from the base section 11) and the curved guide plane formed from the molded section 51 (part of base section 11) and section 52 (part of cover 12). The stripping post 49 tends to eliminate tangling which might otherwise result from the tape loop 20 sticking to the pinch roller 22. The tape guide 45, the corner guidepost 47, and the stripping post 49 are preferably constructed of a material having an exceedingly low coefficient of friction such as nylon or Teflon (a registered trademark for polytetrafluoroethylene).

A retaining ring 55, mounted on the cover 12 concentrically with the upper half 38 of the reel assembly axle, has an outside diameter slightly shorter than the inside diameter of the hub 32 such that the retaining ring 55 telescopes inside of the hub 32 when cover 12 is in position. The retaining ring 55 accordingly tends to prevent snagging of the tape by preventing the tape from flowing between the reel drum and the inner surface of cover 12.

As shown in FIGURE 2 of the drawings, three brake pads or cushions 57, 58 and 59 are fixedly mounted to the interior surface of the cover 12 about the axle half 38. Each of the cushions 57 through 59 is constructed of resilient pliable material such as a low or medium durometer vulcanized rubber or a similar elastomer. With the cover 12 closed, the pads 57 through 59 are positioned adjacent the coil 34 to secure the coiled tape in position when the magazine is not in use. As will be more clearly understood from the description to follow, means are employed for disengaging the coil 34 from the cushions 57 through 59 in order to permit free movement of the tape coil during operation.

Figure 3:
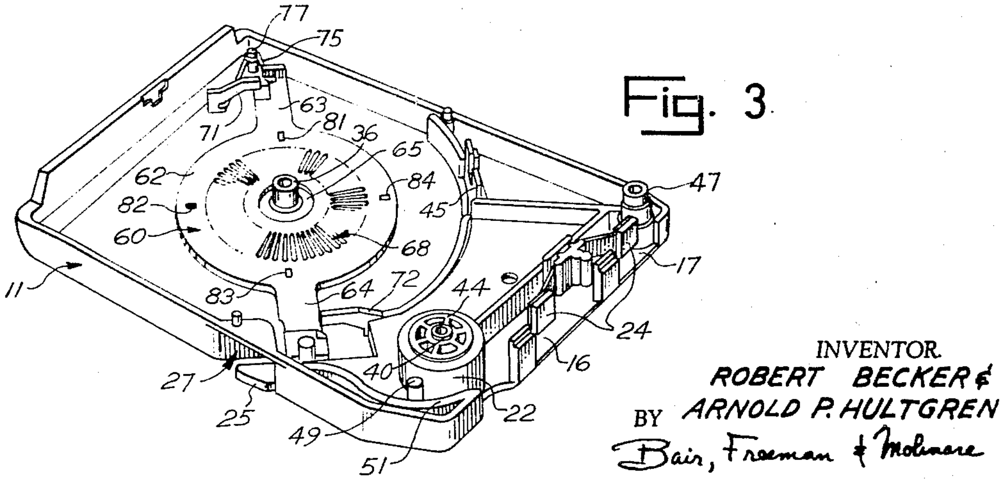
FIGURE 3 is a perspective view of the base section of the magazine shown with the tape reel assembly removed.

In FIGURE 3 of the drawings, the base section 11 of the magazine is shown with tape reel assembly removed to more clearly show the details of the brake shoe member indicated generally at 60. The member 60 comprises a substantially circular central portion 62 and a pair of oppositely extending arms 63 and 64. The circular center portion 62 is located concentrically about the hollow axle half 36 by means of a central locating washer 65. The thickness of washer 65 exceeds that of brake shoe member 60. An annular portion of the upper surface of the circular center section 62 of the brake shoe member 60 is serrated by a plurality of radially extending notches shown generally at 68.

The opposed arms 63 and 64 of the brake shoe member 60 extend under rearward and forward cam members 71 and 72 respectively. The extremity of extended arm 63 engages with one end of a wire spring 75, the central portion of which is wound around a binding post 77 which extends upwardly from the interior surface of the base section 11. The other end of wire spring 75 is retained by the cam member 71. The wire spring 75 tends to rotate the brake shoe member 60 clockwise as viewed from above, forcing the brake actuator 25 (which engages with the extremity of extended arm 64) outwardly of the base section 11. As will be discussed in more detail in conjunction with FIGURES 6 through 8 of the drawings, the wire spring 75 serves to force the brake shoe member 60 upward against the underside of the turntable 30 to prevent rotation of the turntable 30 and to clamp the tape coil 34 between the turntable 30 and the cushions 57 through 59. The brake is released to condition the magazine for operation by depression of the brake actuator 25 to rotate the brake shoe 60 counter-clockwise as viewed from above against the force of wire spring 75. As will be discussed, rotation of the brake shoe 60 in this manner allows the brake shoe to move downward, retracting the platform 34 away from the cushions 57 through 59 to release the coil 34 and to release the engagement between the brake shoe member 60 and the platform 30.

Figure 4:
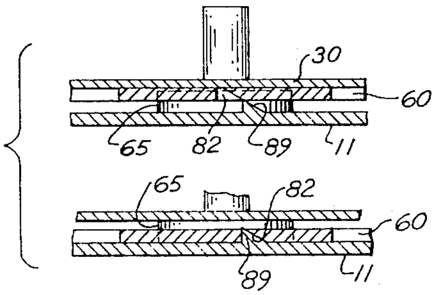
FIGURE 4 is a partial cross-sectional view taken along the lines 4—4 of FIGURE 5 and illustrating the axial movement of the brake shoe and tape reel assemblies.

FIGURE 4 of the drawings illustrates the manner in which axial movement is imparted to the brake shoe member 60 as it is rotated. As shown in FIGURE 3, four notches 81 through 84, which are cut into the under surface of the central section 62 are distributed at 90° about the axle half 36. The notch 82 is shown in cross-section in FIGURE 4. Four wedge-shaped projections 85 through 89 extend upwardly from the floor 11 into the notches 81 tthrough 84 respectively. The wedge-shaped projection 89 associated with notch 82 is shown in FIGURE 4. The upper drawing of FIGURE 4 shows the relationship between notch 82 and projection 89 when the brake is actuated; that is, when the brake shoe 62 is engaged with the platform 30.

Figure 5:
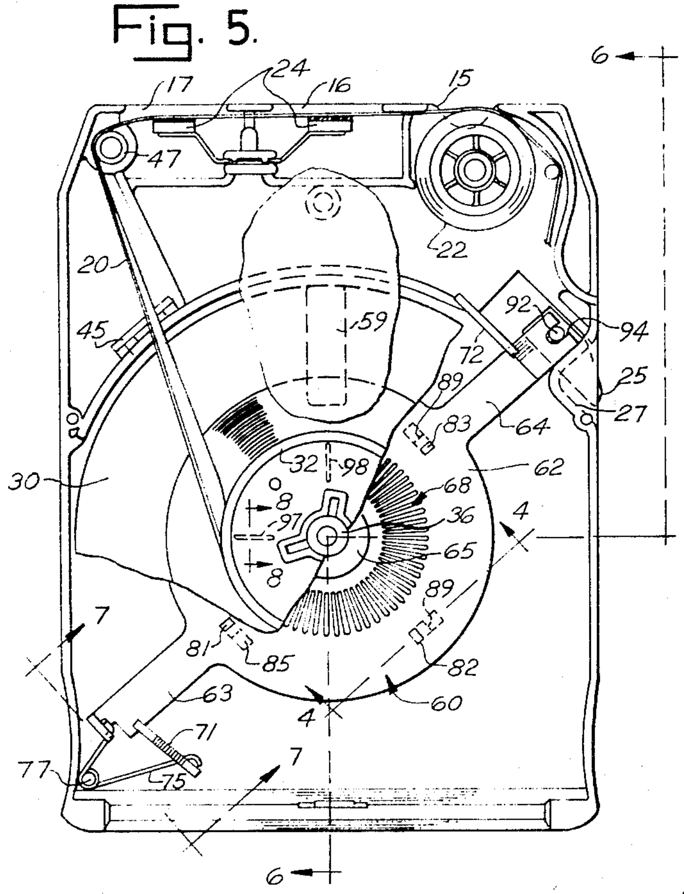
FIGURE 5 is a top plan view of the base section of the magazine shown in FIGURES 1–3 with a portion of the reel assembly broken away to show the details of the brake shoe assembly.

Upon depression of the brake actuator 25 (shown in FIGURE 5), the brake shoe member 60 is rotated counter-clockwise. As shown in FIGURE 4, this allows the central section 62 to slide downwardly as the projection 89 enters the notch 82. Upon release of the actuator 25, spring pressure from the wire spring 75 rotates the central section 62 in a clockwise direction (viewed from above as in FIGURE 5). The inclined surfaces of the projections 85 through 89 force the central section 62 upward as the brake shoe member is rotated.

When the central section 62 is at its lowest (released) position, the platform 30 supporting the tape coil 34 engages with and rotates on the central washer 65. As shown in the lower view of FIGURE 4, the washer 65 is substantially thicker than the brake shoe member 60 such that the platform 30 is held in spaced relation from brake shoe member 60. As the member 60 moves upward during clockwise rotation imparted by wire spring 75, it engages with the platform 30, carrying platform 30 upward also as shown by the upper view of FIGURE 4.

Figure 6:
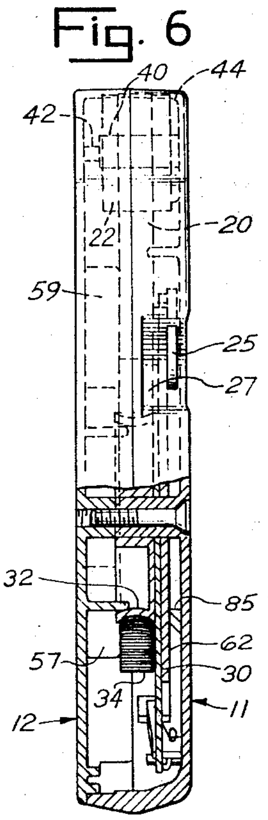
FIGURE 6 is a side plan view of the magazine shown in FIGURE 1.

As seen most clearly in FIGURE 6 of the drawings, the axial movement of platform 30 caused by the axial movement of the brake shoe member 60 clamps the coil 34 between the platform 30 and the cushions 57 through 59 (cushion 57 being shown in FIGURE 6).

Figure 7:
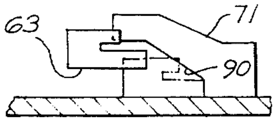
FIGURE 7 is a partial cross-sectional view taken along the lines 7—7 of FIGURE 5 and showing the operation of the rear cam member.

FIGURE 7 of the drawings illustrates the manner in which the cam members 71 and 72 insure downward movement of the brake shoe member 60 to release the brake upon depression of the actuator 25. As shown in FIGURE 7, the extended arm 63 of the brake shoe member 60 extends under the cam member 71 such that counter-clockwise rotation of the brake shoe member 60 causes the edge of the extended arm 63 to engage with the beveled undersurface 90 of the cam member 71, forcing the arm 63 downward. Cam member 72 operates similarly in engagement with the extended arm 64.

The actuator 25 engages with the extended arm 64 by means of a pin 92 which extnends upwardly from the actuator 25 and engages with a notch 94 at the extremity of arm 64. This arrangement permits axial movement of the arm 64 with respect to the actuator 25.

Figure 8:
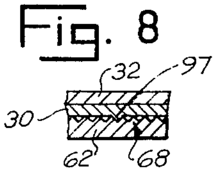
FIGURE 8 is a partial cross-sectional view taken along the line 8—8 of FIGURE 5 showing the engagement between a downwardly extending rib on the turntable and the indented serrations on the brake shoe member.

As the brake shoe member 60 moves upward, the serrations 68 distributed around the inner portion of the central section 62 engage with four ridges which extend downwardly from the undersurface of platform 30. Two of these ridges are shown at 97 and 98 in FIGURE 5. FIGURE 8 of the drawings shows a detailed cross-sectional view of the engagement between ridge 97 and the serrations 68. Brake shoe member 60 thus serves to prevent rotation of the platform 30 and the hub 32 whenever the magazine is not in use.

As seen in FIGURE 6 of the drawing, the outer surface of the hub 32 is concaved inwardly. The curved contour of the hub 32 is preferably hyperbolic to insure smooth takeoff of the inner convolution of tape without snagging, bending, or kinking of the tape. The hyperbolic contour allows the tape to touch the hub's outer wall from one edge of the hub to the other as it is being drawn from the coil. The elimination of a point contact surface greatly improves the operation and reliability of the arrangement.

It is to be understood that the tape-carrying magazine which has been described is merely illustrative of the principles of the invention. Numerous modifications of the arrangement may be devised by those skilled in the art without departing from the true spirit and scope of the invention.

What is claimed is:

1. An improved magazine for carrying a continuous loop of magnetic sound tape, a portion of which is wound into a spiral coil and the remainder of which is aligned along a path joining the innermost and the outermost convolutions of said spiral coil, which comprises, in combination,
 - a platform for supporting said coil,
 - means for mounting said platform for rotation about an axis and for movement parallel to said axis,
 - a brake shoe member mounted adjacent said platform for movement parallel to said axis,
 - at least one friction pad fixedly mounted on said magazine on the side of said platform opposite from said brake shoe,
 - and means for moving said brake shoe from a position spaced apart from said platform through a position of first engagement with said platform where said brake shoe thereafter carries said platform and coil to a braking position where said coil engages with said pad,
 - whereby said brake shoe locks said platform against rotation about said axis and where said pad locks at least a portion of said coil against movement.

2. An improved magazine as set forth in claim 1 including means mounting said brake shoe member for rotation about said axis, said magazine including means for imparting axial movement to said brake shoe as it is rotated and a control lever for rotating said brake shoe.

3. An improved magazine as set forth in claim 2 including roller means when operating adapted to engage with and move said sound tape and to rotate said platform in a first direction, means for preventing the mutual rotation of said brake shoe member and said platform when said platform is in said braking position, and a cam mounted on said magazine adjacent said brake shoe member to cause said brake shoe member to move axially toward said friction pad when said brake shoe member and said platform are rotated in said first direction.

4. A magazine as set forth in claim 1 wherein said friction pad takes the form of a cushion constructed of resilient material.

5. A magazine as set forth in claim 1 including a hollow central hub mounted on said platform for locating said coil concentrically with said axis and including a cylindrical member fixedly mounted on said magazine and extending into the hollow interior of said hub.

6. A magazine as set forth in claim 1 including spring means for normally holding said brake shoe member and said platform in said braking position and a control lever operable from the exterior of said magazine for moving said brake shoe member to said spaced apart position.

7. A magazine for carrying an endless coil of sound tape comprising, in combination,
 - a substantially rigid turntable for supporting said coil slidably mounted within said magazine on an axle for axial movement along said axle,
 - at least one friction pad fixedly mounted with respect to said magazine in spaced relation from said turntable, and
 - braking means adapted to engage with and bodily move said turntable along said axle such that said coil is moved into engagement with said friction pad, said braking means including means for retarding rotation of said turntable.

8. An arrangement as set forth in claim 7 wherein said braking means comprises a brake shoe member, means for mounting said brake shoe member for rotation about said axle, means for imparting axial movement to said brake shoe as it is rotated, and a control lever for rotating said brake shoe member.

9. An arrangement as set forth in claim 8 wherein said control lever extends outwardly through an aperture in said magazine to afford access to said control lever from the exterior of said magazine.

10. An arrangement as set forth in claim 9 including a hollow central hub mounted on said turntable for locating said coil concentrically with said axle, said arrangement further including a cylindrical member mounted on said magazine and extending into the hollow interior of said hub.

References Cited

UNITED STATES PATENTS

| | | | |
|---|---|---|---|
| 2,922,642 | 1/1960 | Cousino. | |
| 2,951,654 | 9/1960 | Steelman. | |
| 3,161,362 | 12/1964 | Smith. | |
| 3,236,468 | 2/1966 | Foret | 242—55.13 |
| 3,259,331 | 7/1966 | Liddle | 242—55.13 |
| 3,326,484 | 6/1967 | Yefsky. | |

BILLY S. TAYLOR, *Primary Examiner.*